United States Patent [19]

Hirschberger

[11] Patent Number: 4,740,415
[45] Date of Patent: Apr. 26, 1988

[54] LOW DENSITY POLYETHYLENE AND LINEAR LOW DENSITY POLYETHYLENE BLENDED COMPOSITION AND ARTICLES PREPARED THEREFROM

[75] Inventor: Michael Hirschberger, Sylvania, Ohio

[73] Assignee: Owens-Illinois Plastic Products, Inc., Toledo, Ohio

[21] Appl. No.: 884,245

[22] Filed: Jul. 10, 1986

[51] Int. Cl.$^4$ .............................................. B32B 7/02
[52] U.S. Cl. .................................... 428/212; 428/500; 206/150
[58] Field of Search ................. 428/500, 35, 516, 212; 206/150

[56] References Cited

U.S. PATENT DOCUMENTS

| | | | |
|---|---|---|---|
| 4,219,117 | 8/1980 | Weaver | 206/150 |
| 4,250,682 | 2/1981 | Braun | 53/48 |
| 4,367,841 | 1/1983 | Mazumdar | 428/349 |
| 4,399,173 | 8/1983 | Anothy et al. | 428/516 |
| 4,399,180 | 8/1983 | Briggs et al. | 428/516 |
| 4,505,970 | 3/1985 | Craver | 428/516 |
| 4,590,124 | 5/1986 | Schoenberg | 428/516 |

OTHER PUBLICATIONS

"Introduction to Extrusion", Paul N. Richardson, 1974, pp. 56–59.

Primary Examiner—Edith Buffalow

[57] ABSTRACT

A polymer composition and articles are disclosed wherein the composition comprises a low density polyethylene resin having a density between approximately 0.920 and 0.935 gram/cc and a melt index between approximately 0.5 and 1.0 grams/10 minutes, admixed with a linear low density polyethylene resin having a density between approximately 0.923 and 0.940 grams/cc and a melt index between approximately 0.75 and 5.0 gram/10 minutes. The composition is useful for forming article carriers, especially those used in carrying groups of metal cans.

6 Claims, 2 Drawing Sheets

LOW DENSITY POLYETHYLENE AND LINEAR LOW DENSITY POLYETHYLENE BLENDED COMPOSITION AND ARTICLES PREPARED THEREFROM

BACKGROUND OF THE INVENTION

The present invention relates to article carriers and particularly to article carriers suitable for holding a group of metal cans and to the polymer composition from which the articles are formed.

In the past, several varieties of carriers have been used to contain metal cans in six packs and other arrangements. Such plastic web carriers are fabricated from a low density polyethylene (LDPE) resin material cut from a continuous plastic extruded sheet. The carriers have a unitary web main structure which has a plurality of can supporting and engaging loops or aperture portions. Six packs of beer and soft drinks are packaged in such band-type unitary flexible plastic web carriers.

During the application of the carriers the cans are grouped in continuous arrangements. The plastic carriers are installed on the cans by packaging equipment which applies the carrier to the cans at a very high speed, often as high as 1500 cans per minute. During the high speed application of the carrier the engaging loop portions of the carrier are stretched, placed over the cans, and subsequently released so that the stretched loops contract and securely engage the cans.

It is important during the stretching of the carrier loop portions over the cans that the resin material not be necked down. If a plastic material "necks down" during stretching, then that material is unacceptable for use as a web-type article carrier material. The resin material which "necks down" is unacceptable partly because it creates an unattractive display of the cans and partly because there is loss of the desired mechanical properties of elasticity and strength of the carrier.

In addition, during the application of the carrier it is important that there is a quick build up of sufficient tension in the loop portion such that the plastic material quickly snaps back and engages the can. If a plastic material does not "snap back" quickly, the packaging equipment cannot operate at its maximum line speed.

It is also important that the resin of the carriers rapidly establish sufficient tension to prevent can release during or immediately after the carrier application process. Therefore, the plastic material must have good short term recoverable stress characteristics. Even if the plastic material of the carrier has sufficient tension to prevent can release during the application process, it is also important that the carriers not lose much tension after a period of time due to relaxation of the plastic material and that the cans not slip from the plastic carrier. Therefore, any plastic material utilized for such carriers must maintain good resistance to stress relaxation over a prolonged period of time.

In addition to the severe demands required of resins useful for web carriers it is also desirable that the resin material be capable of being used with existing conventional processing and application equipment as well as being used with new and more efficient processing and application equipment. The resin material must maintain the desirable properties of the currently used web carriers.

The carriers should be able to withstand rotation or "facing" of the cans within the carrier during display in retail outlets. This rotation of the cans sometimes results in necking or breakage of the loops and the undesirable premature release of the cans. Also, it is desirable that the resin material of the carrier have sufficient stiffness so that the resin material does not flex during the production, storage or application process of the carrier. In addition, it is desirable that the carriers have sufficient stiffness so that a consumer may easily pick up the beverage package without having the carrier bend.

Also, the carriers should be resistent to various severe conditions during the application of the carrier on the cans. Sometimes these conditions cause environmental stress cracks in the carrier. Such conditions include exposure to grease and machine oil from the packaging equipment and cause the plastic material of the carrier to develop cracks to such a point that the plastic carrier becomes weakened, loses tension, and becomes more prone to tearing, thereby prematurely releasing the can from the carrier.

Due to competitive pressures, there is a desire to reduce the cost and improve the quality of the plastic web carriers. One possible way to reduce cost and improve quality would be to replace the LDPE resin material with a lower cost, higher quality resin material. The LDPE resin currently used to make the Hi Cone ® (Hi Cone ® is a registered trademark of Illinois Tool Works) plastic web carriers commands a premium price among the various grades of LDPE resins. The LDPE resin useful for a web carrier requires a unique combination of properties that are at the edge of technological and economical feasibility. Such LDPE resins require the unique properties of a low melt index, a relatively high density and an extremely broad molecular weight distribution. These requirements for the LDPE resins were established in order to to optimize stiffness and processability of the carriers. There are various grades of linear low density polyethylene (LLDPE) resin material which are stiffer, stronger and tougher than LDPE resins. The LLDPE resins also are generally more resistant to environmental stress cracking conditions than LDPE resins. The LLDPE resins are more cost attractive than LDPE resins because LLDPE resins are manufactured using a low pressure process which is less costly than the high pressure process used to manufacture LDPE resins.

However, there are several difficulties and drawbacks to using LLDPE resins in place of LDPE resins for use in making web carriers. The LLDPE resins have shorter molecular branches and a lower entanglement density which allows the molecules to "slip" past each other more easily. This "slipping" causes the tension in the LLDPE resins to relax over a period of time. The less "rubbery" characteristics associated with linear versus long branched polyethylene molecules interfere with the severe demands put on the resin material during the application process, handling and storage of the carriers. These severe demands on the web carriers include absence of "necking down" of the resin during stretching, rapid elastic recovery or snap back during carrier application to the cans, establishment of sufficient tension to prevent can release during application, and long-term can retention in the carrier during handling and storage. Also, LLDPE resins are known to be difficult to cut, thereby causing problems of achieving a clean cut during a punching press operations. Excessive scrap material of the LLDPE resin is generated and frequent cleaning of the punching press is required.

Until the present invention, carriers were not made using linear low density polyethylene resin materials. One obstacle in using a LLDPE resin is that LLDPE resins have a greater tendency to neck down during stretching than LDPE resins. The LLDPE resins have inferior elastic recovery characteristics such that during a high speed article carrier application process it would be expected that the loop portions would fail to rapidly snap back and maintain a firm tension grip against the cans. Also, LLDPE resins have been reported to show less resistance to creep and to stress relaxation. Creeping (or stretching of the material) occurs when the resin material is held under a constant force and the material stretches under such constant force. Stress relaxation occurs when the resin material is elongated and held constant at a predetermined elongated length for a period of time, during which time the force to maintain that elongated length decreases. Further, it would be expected that excessive generation of scrap material would occur during the punch press operations since the LLDPE resin material does not cut cleanly, and the stamping presses would need frequent cleaning.

Accordingly, there is a benefit to develop a web-type article carrier having advantageous cost, chemical and mechanical properties such that the use of such carrier increases manufacturing economics and finished product performance of the carrier. The carrier material should not neck down while being stretched during the application of the carrier on the cans. Further, the carrier material should snap back quickly to engage the can and should quickly build up sufficient tension such that the carrier material firmly engages the cans and allows the cans to be rapidly processed through the conventional application equipment. The carrier should continue to firmly engage the cans after application to the cans at least as well as present article carriers to insure can retention during packaging, storage, shipping to wholesalers and retailers, and final consumer use.

The carrier material should be capable of being formed into a variety of designs and be capable of gripping a variety of can surface finishes. The carrier material should resist degradation during packaging and processing of the packaged cans. The carrier also should have sufficient stiffness so that there is consumer ease of handling of the article carrier.

SUMMARY OF THE INVENTION

The present invention relates to article carriers formed from a low density polyethlene (LDPE) resin material blended or admixed with a linear low density polyethylene resin (LLDPE) material. According to one aspect of the invention, there is provided a blend of a LLDPE resin having a density of approximately between 0.923 and 0.940 grams/cc and a melt index of approximately between 0.75 and 5.0 grams/10 minutes admixed with a LDPE resin having a density of approximately between 0.920 and 0.935 grams/cc and a melt index of approximately between 0.5 and 1.0 grams/10 minutes. The article of the invention comprises between 10–75%, by weight of the LLDPE resin and between 25–90%, by weight of the LDPE resin. In one embodiment of the invention, the article carrier comprises approximately 25% of a LLDPE resin having a density of approximately 0.926 g/cc and a melt index of approximately 1.0 g/10 minutes admixed with approximately 75% of a LDPE resin having a density of approximately 0.9265 g/cc and a melt index of approximately between 0.5 and 0.8 g/10 minutes. In another embodiment of the invention, the article carrier comprises approximately 25% of a butene base LLDPE resin having a density of approximately between 0.923 and 0.935 g/cc and a melt index of approximately between 1.0 and 3.0 g/10 minutes admixed with approximately 75% of a LDPE resin having a density of approximately 0.9265 g/cc and a melt index of approximately 0.8 g/10 minutes.

The article carrier of the present invention is well suited for use with high speed conventional application equipment since the LDPE/LLDPE blend material of the carrier of the present invention does not neck down while stretching over the cans, and the LDPE/LLDPE blend material snaps back quickly to engage the can firmly. Further, sufficient tension in the material is quickly built up such that existing production and application equipment may be used to apply the carrier to the cans. The article carrier of the present invention retains sufficient tension during loading and handling of the article over a prolonged period of time such that the shelf life of the article carriers is greatly increased.

The article carrier of the present invention comprised of a LDPE/LLDPE blend resin has several key advantages over pure LDPE resin article carriers. The use of LLDPE resins admixed with LDPE resins reduces product cost while improving product quality. Not only are the LLDPE resins less expensive to manufacture than LDPE resins, but also the LLDPE resins are generally stronger than LDPE resins, stiffer or less likely to flex than LDPE resins, tougher or less likely to break than LDPE resins, and have a greater resistance to environmental stress cracks than LDPE resins. The addition of a LLDPE resins to a LDPE resin to form an article carrier thus gives an article carrier having advantageous cost, chemical and mechanical properties not found previously.

BRIEF DESCRIPTION OF THE DRAWINGS

The details of the invention will be described in the accompanying specification in view of the drawing, in which.

DESCRIPTION OF THE INVENTION

The present invention provides a blend of a low density polyethylene (LDPE) resin with a linear low density polyethylene (LLDPE) resin for use in article carriers. While blends of low density polyethylene and linear low density polyethylene resins have been used for trash bags and various other products, it was previously unknown to use such blends for web-type article carriers. LLDPE resins are not as "rubbery" as LDPE resins, and straight LLDPE resins cause problems in the use of LLDPE resins for web-type carriers. The web-type article carriers have various unique requirements including absence of necking down of the resin material during stretching over the cans, rapid snap back during the application process, rapid establishment of sufficient tension in the resin material during the application process, and maintenance of tension during transportation, storage and retail of the filled article carriers.

The present invention relates, in particular, to article carriers, particularly can carriers, fabricated from a low density polyethylene (LDPE) resin intimately admixed with an amount of linear low density polyethylene (LLDPE) resin. As defined herein, "low density polyethylene" is a branched homopolymer of ethylene produced by high pressure processes having a density of approximately between 0.920 and 0.935 grams/cc and a melt index of approximately between 0.5 to 1.0 grams/10 minutes. As defined herein, "linear low density polyethylene" is a linear backbone copolymer with short side branches of an alpha olefin such as ethylene, butene, hexene, heptene, or octene which is generally produced by low pressure processes. The LLDPE resins for use in the article carriers of the present invention generally have a density of approximately between 0.923 grams/cc and 0.940 grams/cc and a melt index of approximately between 0.75 to 5.0 gram/10 minutes. Additionally, slip agents, anti-block agents, and anti-oxidizing agents may be added to the LDPE/LLDPE resin material to aid in production and processing of the article carriers of the present invention. Also, photo-reactive agents may be added to the LDPE/LLDPE resin material to induce the photo-degradation of the carriers after their useful life. Such agents are known in the art and may be added using existing techniques.

Figure 1:
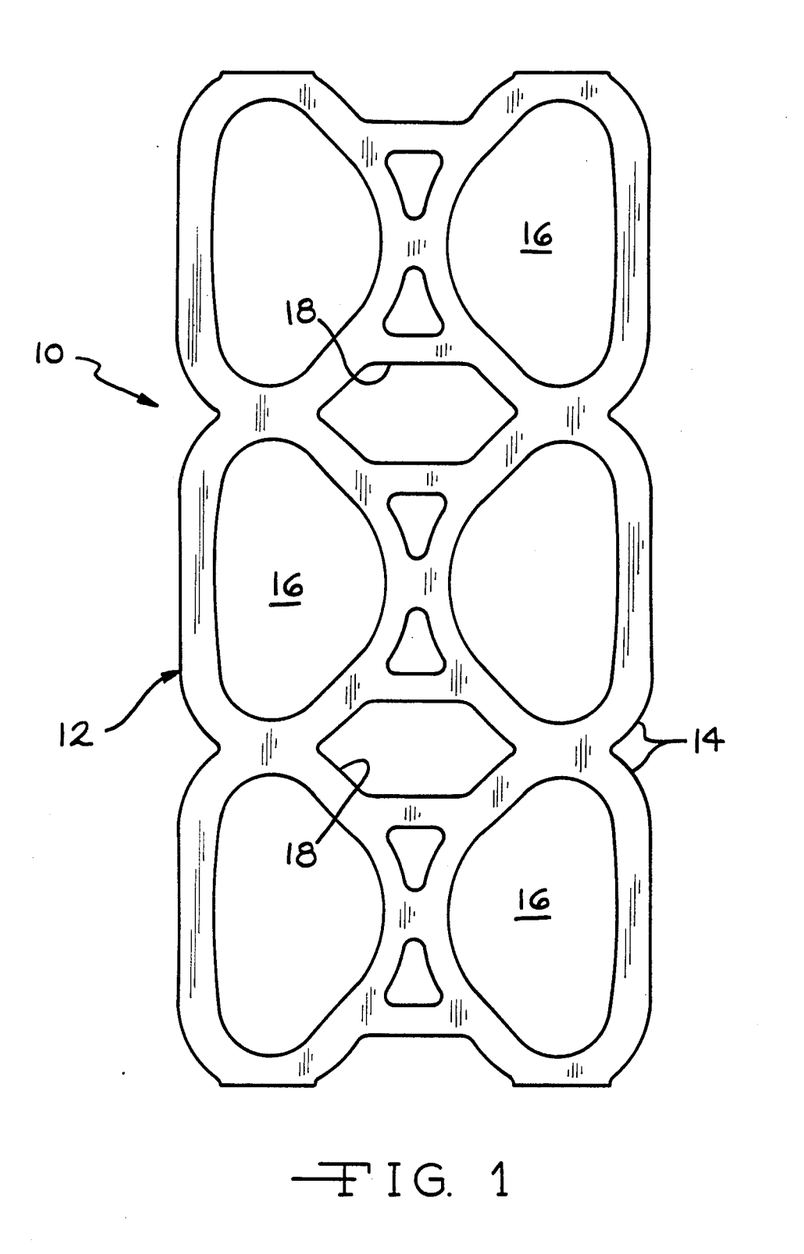
FIG. 1 is a perspective view of an article carrier, according to the present invention, suited to contain cans.

A variety of designs of carriers maybe used. One such carrier 10, according to the present invention, is shown in FIG. 1 and includes a unitary web portion 12 which includes a plurality of can supporting and engaging loop portions 14 which form the circular can accepting apertures 16. Typically, the article carrier 10 includes a pair of hand grip portions 18 for carrying the contained cans. Typically, such carriers are about 16 mils thick, but can be downgauged up to approximately 6 to 7%, if desired, relative to existing LDPE resins.

Various samples of resin materials were compared to the currently used resin materials. The resin materials selected for evaluating included low density polyethylene, (LDPE), high density polyethylene (HDPE) and linear low density polyethylene (LLDPE). The Union Carbide LDPE resin DHDG 4163 and Dow LDPE resin PE-357 are currently used in the formation of Hi-Cone$^R$ web-type carriers such as the configuration shown in FIG. 1. The linear low density polyethylene resins included: Dow 2049; Dow 2045; Dow 2042; Dow 2038; Dow 2032; and Union Carbide UCC-7341. The high density polyethylene resin (HDPE) evaluated was Union Carbide DGDA 6097.

Fifteen samples were prepared and evaluated. Each sample had a sheet thickness of 16.5±0.5 mils. The first 7 samples were either straight LDPE or LLDPE resins. Samples #8 through #14 were blends of LDPE/LLDPE resins while sample #15 was a blend of LDPE/HDPE resins.

The selection of the various grades of LLDPE resins was based upon their melt index and density values. The slope of the viscosity versus shear rate of the LLDPE resins in the molten state, known as shear sensitivity, makes the LLDPE resins relatively more difficult to process than the LDPE resins. The comparatively lower shear sensitivity of LLDPE resins versus LDPE resins indicates that the use of higher melt-index grades of LLDPE resins may be preferred in order to prevent excessive extrusion pressures, temperatures and torque (or horsepower). However, a resin with an overly high melt index can result in a reduction in the melt strength of the resin which also can result in the reduction in the thickness uniformity of the extruded resin sheet. Also, a resin with an overly high melt index sacrifices mechanical as well as environmental stress crack resistance properties. The density of a resin influences the stiffness of the material. It is desirable to have stiffness of the LLDPE resins which are larger than or comparable with the LDPE resins. The densities of the LLDPE resins chosen for the first phase of testing are between 0.920 and 0.935 grams/cc and the melt indexes of the LLDPE resins are between 0.80 and 2.0 grams/10 minutes.

A summary of the resins used, their source, and various proportions in which they were combined is shown in Table I below. The evaluations included a measurement of necking strain, i.e., the elongation of the material at which necking occurs. Necking strain was evaluated in the transverse direction since necking was found to occur earlier in the transverse direction as opposed to in the machine direction. A measurement of such necking strain is critical because if the material necks (i.e., it loses its shape), the material is unacceptable for use as an article carrier. Additionally, visual observation was made as to whether the material necked in the transverse direction when the material was rapidly stretched to 45% which is approximately the level of stretch during the application process.

Figure 2:
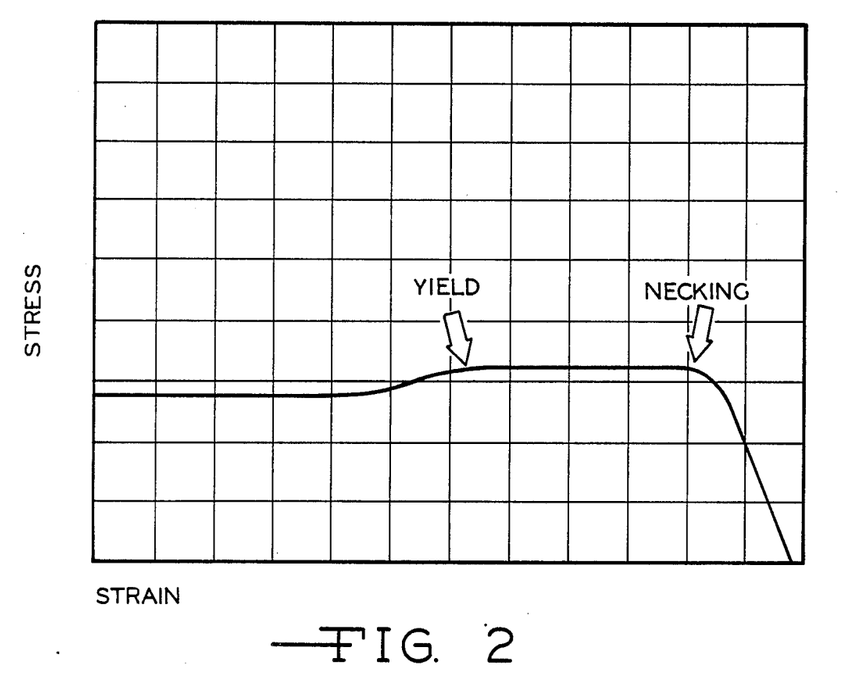
FIG. 2 is a graph showing a stress strain curve of a blend of low density polyethylene resin and linear low density polyethylene resin at 20 inches per minute.
Figure 3:
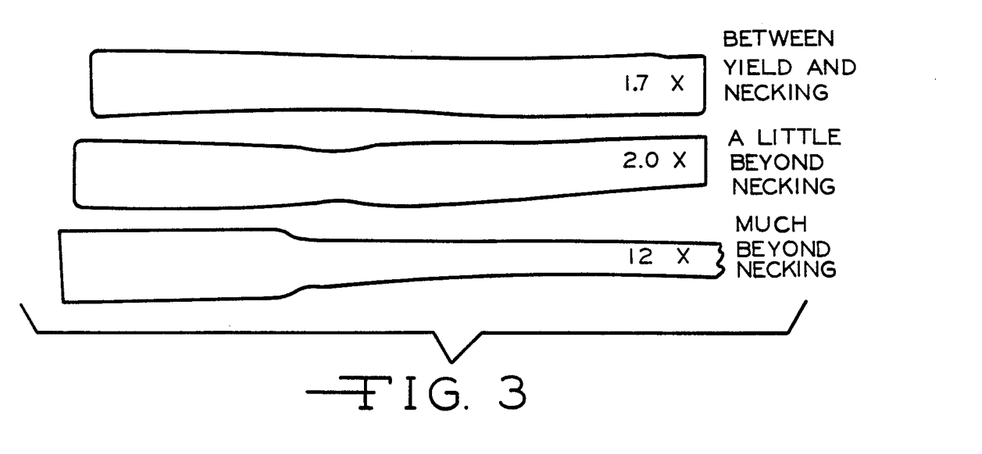
FIG. 3 is a plan view of samples of various resin materials stretched beyond the yield point of the material.

At low elongation speeds, the samples produced stress-strain curves of a type where there is a maximum in the curve which represents the yield point. However, at the relatively high rates employed in the evaluation, all samples exhibited a characteristic plateau as shown in FIG. 2. A series of tests involving similar samples were stopped and examined after being stretched to various levels. Some of these samples are shown in FIG. 3. Only after stretching beyond the end point of the plateau could necking be observed with the naked eye. It is estimated that the elongation rate during the application process is an order of magnitude faster than the elongation rate used during the evaluations. Thus, if a resin sample was on the verge of necking during the evaluations, then that resin sample would most likely neck during the application process. At the "necking point" the material becomes unacceptable and unfit for use as an article carrier. In the currently used web carrier application processes, the LDPE resin stretches beyond the yield point, but not beyond the necking point. Once the plateau region is reached, the material has changed permanently —but the damage is not so severe as to prevent its use. Determination of the necking point offers a confirmation of what is visually observed with regard to the material stretchability range and allows for a quantitative ranking of different compositions of matter. The "neck/no neck" judgment, as shown in Table II below, was based on visual inspection of the sample that were rapidly stretched to 45%. If necking did occur, it was generally much more severe in the transverse direction. As such, only transverse direction necking information is reported in Table II. As shown in Table II and FIG. 3, the LDPE/LLDPE resin blends show total recovery with no visible signs of necking down.

The samples were also evaluated to determine whether the resins meet acceptable snap back requirements. The time it takes the plastic material to snap back is defined as the elastic recovery time. The method used to determine the elastic recovery time involves rapid stretching of rectangular test specimens of the various extruded sheet samples for a fixed distance using a tensile tester. Once the specimen has been elongated to a preset length, the load is automatically released and the crosshead is rapidly retracted to a preset final distance. During evaluation the specimen was stretched 45% and retracted to 20%. The elapsed time between the point in time at which the clamps start to retard and the point in time at which stress reappears in the specimen is the elastic recovery time. If a sample resin material takes too long to snap back once it has been stretched, the material could be unfit for use as a web carrier because, at the high application speeds the cans might fall out before being grabbed by the loop portions of the carrier. Thus maximum speed of the application equipment is dependent upon the elastic recovery time of the resin material. As shown by the data in Table II, the resin materials can be compared with each other, or ranked in increasing time order. If the resin materials show comparable resistance to necking, rapid establishment of sufficient tension and maintenance of tension over prolonged periods of time, then the resin material having the shorter elastic recovery time will be more preferable for use in carrier applications. However, while the LDPE/LLDPE resins have elastic recovery times of from 0.663 to 0.742 seconds the LDPE/LLDPE resins are comparable to the elastic recovery times 0.651 to 0.659 for the standard LDPE resins currently being used commercially (runs #5 and #6) for the Hi Cone ® carriers, and as shown by the evaluations of a LDPE/LLDPE resin applied to cans (as discussed in detail below with reference to Table III), the LDPE/LLDPE resins having a longer elastic recovery time than the LDPE resin are still expected to perform well in the high speed application process and are considered to be acceptable LDPE/LLDPE resins for use as web carriers.

The sample sheets were also evaluated to determine whether the resins establish sufficient tension to prevent can release during application of the carrier. This requirement is evaluated by measuring the short-term recoverable stress when the sample is initially stretched 45% and then allowed to retard to 20% strain. While there is a slight loss in the short-term recoverable stress for some of the LDPE/LLDPE resins when compared to the LDPE resins of runs #5 and #6, the LDPE/LLDPE resins do show acceptable short-term recoverable stress measurements. Note that run #10, a blend of 25% LDPE and 75% LLDPE, exhibits an unexpectedly higher amount of short-term recoverable stress (and only a slightly slower elastic recovery time) than the standard LDPE resin show in run #5.

To further illustrate the advantageous characteristics of the article carrier of the present invention, the amount of tension the LDPE/LLDPE blend carrier materials are able to maintain over a prolonged period of time was evaluated. Without this long-term tension, the carrier may tend to relax too much over a period of time thereby permitting the cans to prematurely release from the carrier. The maintenance of tension of the resins was evaluated by measuring the recoverable stress at 5 seconds and at 100 hours. The following samples were evaluated: 100% LLDPE resin (run #3); 100% LDPE resin (run #5); 100% LDPE resin (run 190 6); 50% LDPE/50% LLDPE resin (run #9); 75% LDPE/25% LLDPE resin (run #11); and 75% LDPE/25% LLDPE resin (run #13). In each case the sample was initially stretched 45% at high speeds (at 20 inches per minute). The sample was immediately allowed to retard to 35% strain. The results of these tests are shown in Table II. The long-term recoverable stress of the LDPE/LLDPE blend resins of the present invention are comparable to and sometimes better than the standard LDPE resins, while the short-term recoverable stress is comparable to the prior art resins.

Note that the LDPE/LLDPE resins tested (runs #9, #11 and #13) have a higher recoverable stress after 5 seconds than the straight LDPE resin (run #5) which was used as the standard for comparison. After 100 hours, two of the LDPE/LLDPE resins (runs #9 and #11) have a higher long-term recoverable stress than the standard LDPE resin, while the third LDPE/LLDPE resin (run #13) has only a slightly lower long-term recoverable stress than the standard LDPE resin (run #5). In addition, the LDPE/LLDPE resin (run #11) has a long-term recoverable stress that is unexpectedly higher than the long-term recoverable stress of either of its components in pure form. Surprisingly, not only are the LDPE/LLDPE resins not inferior in long-term recoverable stress, but sometimes are better than the standard LDPE resin. The LDPE/LLDPE resin carriers according to the present invention show acceptable long-term recoverable stress needed for retention over a prolonged period of time.

High density polyethylene resins (HDPE) consist of very linear molecules. The HDPE grade resins having a density of approximately 0.960 g/cc. have been shown to neck severely. The HDPE resins having a relatively low density of 0.948 g/cc. was selected for blending with a LDPE resin in order to attempt to minimize the negative effects of the higher density resins and to achieve a HDPE/LDPE resins having desirable "rubbery" characteristics. A blend of 25% higher density polyethylene (HDPE) resin and 75% LDPE resin (run #15) was compared to the LDPE/LLDPE resins. The LDPE/HDPE resin was observed to be on the verge of necking at the 45% elongation level, which is attributed to the HDPE resin's "linearity" of its molecules. Further, the LDPE/HDPE resin also exhibited a relatively long elastic recovery time of 0.818 seconds. As such, the LDPE/HDPE resin is unacceptable as a candidate resin for web carriers.

TABLE I

| | Summary of Resin Type, Source and Proportions Used in Evaluations (First Phase) | | | | | | | | | |
|---|---|---|---|---|---|---|---|---|---|---|
| | Resin | | | | | | | | | |
| | LLDPE | | | | | | LDPE | | | HDPE |
| Grade | DOW 2049 | DOW 2045 | DOW 2042 | DOW 2038 | DOW 2032 | UCC 7341 | DHDG 4163 | DOW PE-357 | DOW 683 | UCC DGDA 6097 |
| Density g/cc. | .926 | .920 | .930 | .935 | .926 | .920 | .9265 | .9265 | .923 | .948 |
| Melt Index g/10 min. | 1 | 1 | 1 | 1 | 2 | .8 | .8 | .5 | .7 | .09 |
| Straight Runs | | | | | | | | | | |
| 1 | 100 | | | | | | | | | |
| 2 | | 100 | | | | | | | | |
| 3 | | | 100 | | | | | | | |
| 4 | | | | | 100 | | | | | |

TABLE I-continued

Summary of Resin Type, Source and Proportions Used in Evaluations (First Phase)

| | Resin | | | | | | | | | |
|---|---|---|---|---|---|---|---|---|---|---|
| | LLDPE | | | | | | LDPE | | | HDPE |
| Grade | DOW 2049 | DOW 2045 | DOW 2042 | DOW 2038 | DOW 2032 | UCC 7341 | DHDG 4163 | DOW PE-357 | DOW 683 | UCC DGDA 6097 |
| 5 | | | | | | | 100 | | | |
| 6 | | | | | | | | 100 | | |
| 7 | | | | | | | | | 100 | |
| Blends | | | | | | | | | | |
| 8 | 25 | | | | | | 75 | | | |
| 9 | 50 | | | | | | 50 | | | |
| 10 | 75 | | | | | | 25 | | | |
| 11 | | | 25 | | | | 75 | | | |
| 12 | | | 50 | | | | 50 | | | |
| 13 | | | | 25 | | | 75 | | | |
| 14 | | | | | 50 | | 50 | | | |
| 15 | | | | | | | 75 | | | 25 |

TABLE II

Summary of Sample Evaluations (First Phase)

| | RUN | | | | | | | | |
|---|---|---|---|---|---|---|---|---|---|
| | 1 | 2 | 3 | 4 | 5 | 6 | 7 | 8 | 9 |
| | SAMPLE | | | | | | | | |
| | LLDPE DOW 2049 | LLDPE DOW 2045 | LLDPE DOW 2042 | LLDPE UCC 7341 | LDPE DHDG 4163 | LDPE PE 357 | LDPE PE 683 | LDPE/LLDPE 4163/2049 75%/25% | LDPE/LLDPE 4163/2049 50%/50% |
| Modulus (PSI) | 64950 | 49400 | 70500 | 60350 | 55600 | 62600 | 62000 | 60150 | 68050 |
| Yield Stress (PSI) | 1695 | 1340 | 2005 | 1510 | 1540 | 1630 | 1635 | 1615 | 1775 |
| Yield Strain (%) | 19.1 | 22.4 | 21.5 | 18.0 | 18.4 | 18.5 | 17.7 | 18.3 | 19.1 |
| TD Necking Strain | 71.5 | 92.3 | 64.0 | 77.1 | 93.1 | 81.3 | 89.6 | 80.5 | 73.6 |
| Ultimate Stress (PSI) | 3420 | 2750 | 3355 | 2720 | 2605 | 2620 | 2650 | 2895 | 3270 |
| Ultimate Strain (%) | >1333 | >1333 | >1333 | >1333 | 1021 | 1024 | 1144 | 1333 | 1333 |
| Elastic Recovery Time (SEC) | .678 | .616 | .771 | .692 | .651 | .659 | .642 | .736 | .669 |
| Recoverable Stress *(After 5 sec., PSI) | 651 | 612 | 656 | 583 | 710 | 673 | 679 | 703 | 658 |
| Does TD Sample Neck? | No | No | No | No | No | No | No | No | No |
| Recoverable Stress **(After 5 sec., PSI) | | | 976 | | 964 | 952 | | | 970 |
| Recoverable Stress **(After 100 hrs, PSI) | | | 834 | | 819 | 770 | | | 885 |

| | RUN | | | | | |
|---|---|---|---|---|---|---|
| | 10 | 11 | 12 | 13 | 14 | 15 |
| | SAMPLE | | | | | |
| | LDPE/LLDPE 4163/2049 25%/75% | LDPE/LLDPE 4163/2042 75%/25% | LDPE/LLDPE 4163/2042 50%/50% | LDPE/LLDPE 4163/2038 75%/25% | LDPE/LLDPE 4163/2032 50%/50% | LDPE/HDPE 4163/DGDA 75%/25% |
| Modulus (PSI) | 60500 | 66600 | 64900 | 67450 | 53800 | 72750 |
| Yield Stress (PSI) | 1635 | 1780 | 1745 | 1830 | 1500 | 2015 |
| Yield Strain (%) | 18.4 | 19.5 | 20.5 | 19.7 | 18.7 | 19.6 |
| TD Necking Strain | 78.9 | 78.1 | 60.0 | 78.4 | 80.8 | 47.2 |
| Ultimate Stress (PSI) | 3170 | 3155 | 3255 | 3145 | 2795 | 2960 |
| Ultimate Strain (%) | >1333 | 997 | 1333 | 1333 | 1333 | 1128 |
| Elastic Recovery Time (SEC) | .663 | .709 | .735 | .742 | .674 | .818 |
| Recoverable Stress *(After 5 sec., PSI) | 742 | 648 | 648 | 685 | 626 | 637 |
| Does TD Sample Neck? | No | No | No | No | No | Marginal |
| Recoverable Stress **(After 5 sec., PSI) | | 1055 | | 965 | | |
| Recoverable Stress **(After 100 hrs, PSI) | | 867 | | 792 | | |

*Sample was initially stretched 45% and then allowed to retard to 20% strain.
**Sample was initially stretched 45% and then allowed to retard to 35% strain.

Article carriers fabricated from the LDPE/LLDPE resin shown in run #11 (75% LDPE/25% LLDPE) were evaluated to determine whether the carriers lose their can retention properties over a period of time. The carriers were evaluated by monitoring the responses of a six-pack type can-filled carrier to severe shaking forces. An official NSDA Package Drop Test made by the Federal Paper Board Company, Montvale, NJ, was used. The equipment was modified with a side bumper to minimize package dancing and the holding fixture was replaced by a horizontal rod to prevent failure through tearing. The equipment was run at 80 strokes per minute at room temperature using 2⅝ inch strokes. The number of strokes causing can drop-out represents the measure of can retention. Several of the tests were stopped after 1500 strokes without reaching failure because of excessive time requirements. Table III below sets forth the comparative experimental results. Quite unexpectedly, after one month storage the average of the number of strokes to failure for the LDPE/LLDPE resin carrier exceeds the standard LDPE carrier by a factor of 100. These results clearly establish that the LDPE/LLDPE resins are suitable as a material for carriers.

Even more surprising is the fact that the LDPE/LLDPE resin carriers of the present invention maintain their retention capabilities over several months. A four month evaluation period was used with stroke testing conducted at 1, 2 and 4 months after storage of the six-pack carriers. As can clearly be seen from the results set forth in Table III, the LDPE/LLDPE resin carrier outperformed the standard LDPE resin carriers. At the one month interval the LDPE/LLDPE resin carrier, on the average, endured 1134 more strokes before failure occurred. At the two month interval the LDPE/LLDPE resin carriers still exceeded the failure rate of the standard LDPE resin carrier by an average of 738 strokes. By four months, the standard and experimental carriers were somewhat closer in the number of strokes to failure but the LDPE/LLDPE resin carrier still exhibit superior can retention capabilities.

TABLE III

Evaluation of Long-Term Can Retention (First Phase)

| | Standard LDPE Carriers | | | Experimental LDPE/LLDPE Carriers | | |
|---|---|---|---|---|---|---|
| | Storage Time After Application (months) | | | | | |
| | 1 | 2 | 4 | 1 | 2 | 4 |
| Strokes to Failure* | 3 | >1500 | >1500 | >1500 | >1500 | >1500 |
| | 14 | >1500 | 1399 | >1500 | >1500 | >1500 |
| | 7 | 332 | >1500 | >1500 | >1500 | >1500 |
| | 4 | 10 | >1500 | 296 | >1500 | >1500 |
| | >1500 | 12 | >1500 | >1500 | 711 | >1500 |
| | 18 | 5 | | >1500 | 977 | >1500 |
| | 8 | 18 | | | >1500 | |
| | 14 | 368 | | | | |
| | 34 | 504 | | | | |
| | 4 | >1500 | | | | |
| Average | 161 | 575 | 1480 | 1295 | 1313 | >1500 |

*Using 2⅜" strokes

In addition to the resins evaluated above, an additional sample consisting of 75% Union Carbide LDPE resin DHDB 4163, (which varies from the LDPE resin evaluated above (DHDG 4163) only in various additives which do not effect the performance of the LDPE resin) and 25% butene based USI-PA 432-16 resin was evaluated. The sample had a sheet thickness of 16.0±0.5 mils. This additional grade of LLDPE resin was selected in order to attempt to achieve good extrudability of LDPE/LLDPE resin blend. Improvement in extrudability is achieved by selection of a resin with higher melt index. In addition, the butene based LLDPE resin was selected because butene based resins are typically less expensive than those LLDPE resins based on octene.

The LDPE/butene base LLDPE sample and a control sample were evaluated in a manner similar to the methods described above. The LDPE/butene base LLDPE resin was judged to be acceptable with regard to necking resistance during stretching, rapid snap back during application, and rapid establishment of sufficient tension. In addition, a use of a butene base LLDPE resin having a relatively high density and melt index reduces the toughness of the resin blend and thereby facilitates maintaining clean cuts of the LDPE/LLDPE resin carrier during the die cut punching process. The butene based LLDPE resin USI-PA 432-16 is thus an attractive candidate for blending with a LDPE resin to produce article carriers.

A further advantage of the LDPE/LLDPE article carriers according to the present invention is resistance to environmental stress cracking. Samples of the 75% LDPE (UCC-4163)/25% LLDPE (Dow 2042) and the 75% (UCC 4163)/25% LLDPE (UPI-butene base) resins of the present invention were evaluated to determine their resistance to environmental stress cracks using the Lander's tests, ASTM-D1693.08. The samples were exposed to a 10% solution of Igepal ®, a nonionic surfactant, at 30° C. No cracks or failures occurred in any of the LDPE/LLDPE resins tested within a 30 day testing period. This is especially surprising since the LDPE resins typically show cracks or failure within 5 to 7 days or less. An optimum time of 2 weeks, before failure in the LDPE resins normally occurs, can be obtained only if the LDPE resins are extruded under very controlled laboratory conditions, which extrusion conditions are impractical in a commercial extrusion process. These results further establish that the LDPE/LLDPE resins are suitable as a material for article carriers.

Still another advantage of the LDPE/LLDPE article carriers according to the present invention is the possibility of downgauging, or reduction in thickness, due to the qualities of the LDPE/LLDPE blends. The amount of downgauging is generally dependent upon the stiffness, or flexural modulus, of the material. The relationship between stiffness and thickness is approximated by the equation:

$$\text{Force/Deflection} = \text{Constant} \times \text{Modulus} \times (\text{Thickness})^3. \quad \text{Equation 1.}$$

If the bending resistance of the new material (LDPE/LLDPE) is to be maintained relative to the old material (LDPE) then the modulus ($M_1$) multiplied by the thickness cubed $(T_1)^3$ of the new material must equal the modulus (Mo) times the thickness cubed $(To)^3$ of the old material or $$(M_1 T_1{}^3 = M_o T_o{}^3). \quad \text{Equation 2.}$$

Rearranging this equation, the ratio becomes $$T_1/T_o = (M_o/M_1)^{\frac{1}{3}}. \quad \text{Equation 3.}$$

Using equation 3, and runs #5 and #13 as an example, $$M_1/M_o = 67450/55600 = 1.21.$$

Inserting the value for $M_1/M_o$ into equation 3 and solving for $T_1/T_o$ yields
$$T_1/T_o = (55600/67450)^{\frac{1}{3}} = 0.938.$$

As shown from the equations above, it can be estimated that the particular LDPE/LLDPE blend of run #14 can be downgauged $(1-0.938) \times 100 = 6.2\%$ while still retaining the same stiffness as the standard LDPE. This same calculation can be used with the other blends to calculate their potential reduction in thickness. The significance of this reduction is that the article carrier of the present invention can be made using less material and thus at a potentially lower cost without causing a sacrifice in the performance of the product. Consequently, the LDPE/LLDPE resin blends are very attractive for use in carriers from the standpoint of both performance and economy.

The LDPE/LLDPE resins according to the present invention, possess the necessary properties for use as a carrier material. The LDPE/LLDPE resins demonstrate resistance to necking, have acceptable elastic recovery times and short- and long-term recoverable stress characteristics which are important requirements for a resin useful for a web carrier. This is quite unexpected since web carriers formed from pure LLDPE resins were regarded as having lower elastic recovery capabilities and stress relaxation characteristics than carriers formed from LDPE resins alone.

Having thus defined the invention in detail it should be understood that various modifications and changes can be made in the invention without departing from the scope and content of the following claims.

What I claim:

1. A flexible article carrier suitable for carying a plurality of cans comprising:
   a unitary flexible extruded sheet,
   a plurality of article supporting punch cut loop portions disposed within said sheet,
   said carrier having substantially uniform thickness throughout,
   said flexible article carrier being formed from a composition comprising a low density polyethylene resin admixed with a linear low density polyethylene resin extruded in the form of a sheet which is thereafter punch cut to form the carrier with loop portions,
   said composition comprising between about 10 to less than 75 percent, by weight, of said linear low density polyethylene resin,
   said low density polyethylene resin comprising a branched homopolymer of ethylene and having a density between approximately 0.920 and 0.935 g/cc and a melt index between approximately 0.5 and 1.0 g/10 minutes,
   said linear low density polyethylene resin comprising a linear backbone copolymer with short side branches of an alpha olefin and having a density of between approximately 0.923 and 0.490 grams/cc and a melt index between approximately 0.75 and 5.0 grams/10 min.,
   said carrier having a high necking strain at high elongation speeds,
   said carrier having long term can retention properties which are higher than a carrier of low density polyethylene resin,
   said carrier having higher resistance to environmental stress cracking than a carrier of low density polyethylene.

2. The flexible article carrier according to claim 1 wherein said composition comprises approximately 25%, by weight, of said linear low density polyethylene resin.

3. The article as set forth in claim 1 wherein the thickness of said sheet is about 16.0±0.5 mils.

4. The flexible article carrier according to claim 1 wherein said composition comprises said low density polyethylene resin having a density of approximately 0.9265 g/cc and a melt index of approximately 0.8 g/10 minutes and said linear low density polyethylene resin having a density of approximately 0.923 g/cc and a melt index of approximately 0.8 g/10 minutes.

5. The flexible article carrier according to claim 1 wherein said composition comprises said low density polyethylene resin having a density of approximately 0.9265 g/cc and a melt index of approximately 0.8 g/10 minutes and said linear low density polyethylene resin having a density of approximately 0.935 g/cc and a melt index of approximately 2.5 g/10 minutes.

6. The flexible article carrier set forth in claim 1 wherein the melt index of the low density polyethylene is about 0.5 g/10 mins. and the melt index of the linear low density polyethylene is about 0.75 g/10 mins.

* * * * *

UNITED STATES PATENT OFFICE
CERTIFICATE OF CORRECTION

PATENT NO. : 4,740,415
DATED : April 26, 1988
INVENTOR(S) : Michael Hirschberger It is certified that error appears in the above-identified patent and that said Letters Patent are hereby corrected as shown below:

Claim 1, column 14, line 4, "0.490" should be --0.940--.

Signed and Sealed this

Twenty-fifth Day of October, 1988

Attest:

DONALD J. QUIGG

Attesting Officer *Commissioner of Patents and Trademarks*